US009140807B2

(12) United States Patent
Cohen et al.

(10) Patent No.: US 9,140,807 B2
(45) Date of Patent: Sep. 22, 2015

(54) RADIATION DETECTION UTILIZING OPTICAL BLEACHING

(71) Applicants: Peter Carl Cohen, Knoxville, TN (US); A. Andrew Carey, Lenoir City, TN (US); Mark S. Andreaco, Knoxville, TN (US); Matthias Schmand, Lenoir City, TN (US)

(72) Inventors: Peter Carl Cohen, Knoxville, TN (US); A. Andrew Carey, Lenoir City, TN (US); Mark S. Andreaco, Knoxville, TN (US); Matthias Schmand, Lenoir City, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 98 days.

(21) Appl. No.: 14/044,896

(22) Filed: Oct. 3, 2013

(65) Prior Publication Data

US 2014/0097346 A1 Apr. 10, 2014

Related U.S. Application Data

(60) Provisional application No. 61/709,565, filed on Oct. 4, 2012.

(51) Int. Cl.
*G01T 1/20* (2006.01)
*G01T 1/202* (2006.01)

(52) U.S. Cl.
CPC . *G01T 1/20* (2013.01); *G01T 1/202* (2013.01); *G01T 1/2018* (2013.01)

(58) Field of Classification Search
CPC .......... G01T 1/20; G01T 1/202; G01T 1/2018
See application file for complete search history.

(56) References Cited

U.S. PATENT DOCUMENTS

| 2,498,461 | A | * | 2/1950 | Skellett ................. 250/389 |
| 4,983,834 | A | * | 1/1991 | Lindmayer et al. ........... 250/581 |
| 5,874,744 | A | * | 2/1999 | Goodman et al. ............ 250/584 |
| 6,310,351 | B1 | * | 10/2001 | Zur .................. 250/370.09 |

OTHER PUBLICATIONS

A. J. Wojtowicz et al., "Electron Traps and Scintillation Mechanism in YAIO3:Ce and LuAIO3: Ce Scintillators", Journal of Luminescence, vol. 79, (1998) p. 275.
J. Glodo et al., "Charge Traps and Emission Kinetics in LuAP:Ce, Proc. SPIE 4412", (2001), p. 216-220.
S. W. S. McKeever, "Thermoluminescence of Solids", Cambridge University Press (1985), p. 42. and p. 137. (Table of contents, introduction and index enclosed).
W. Drozdowski, et al. "Effect of Electron Traps on Scintillation of Praseodymium Activated Lu3A5IO12, IEEE", Trans. Nucl. Sci., vol. 56, No. 1 (2009) p. 320-327.

* cited by examiner

*Primary Examiner* — David Porta
*Assistant Examiner* — Mindy Vu
(74) *Attorney, Agent, or Firm* — Peter Kendall

(57) ABSTRACT

A method and device for improving the optical performance (such as time resolution) of scintillation detectors using the optical bleaching technique are disclosed. Light of a selected wavelength is emitted by a light source into a scintillator. The wavelength is selected to meet the minimum energy requirement for releasing of charge carriers captured by the charge carrier traps in the scintillation material. Trap-mediated scintillation components are thus reduced by optical bleaching and the optical performance of the scintillator crystal and the detector is enhanced.

9 Claims, 2 Drawing Sheets

US 9,140,807 B2

RADIATION DETECTION UTILIZING OPTICAL BLEACHING

CROSS-REFERENCE TO RELATED APPLICATIONS

This application claims the benefit of U.S. Provisional Application Ser. No. 61/709,565, filed Oct. 4, 2012, which provisional application is incorporated herein by reference.

TECHNICAL FIELD

This disclosure relates to radiation detectors employing scintillator materials and particularly to scintillation detectors with improved optical characteristics due to reduced charge carrier trapping. Certain arrangements also relate to specific components and configurations of such scintillation detectors and method of making the same.

BACKGROUND

Scintillator materials, which emit light pulses in response to impinging radiation, finds a wide range of applications, including medical imaging, particle physics and geological exploration. In a typical scintillation detector for radiation detection, a scintillator crystal is coupled to light sensor, such as a photomultiplier tube (PMT), photodiode, or silicon photomultiplier. The performance of such detectors can be adversely affected by various defects in the scintillator crystal. Efforts have been made to improve the scintillator growth process to reduce the concentrations of the various defects and otherwise improve the performance of scintillator materials and detectors. Nonetheless, there is a continued need for scintillator materials and detectors with improved optical characteristics.

SUMMARY

This disclosure relates to a method of improving the optical performance (such as time resolution) of scintillation detectors using the optical bleaching technique. Certain defects, commonly known as "charge traps" or "charge carrier traps," degrade optical performance parameters such as rise time and decay time. Optical bleaching allows the release of charge carriers captured by the traps in the material by irradiation of this material with light, thereby reducing trap-mediated scintillation components and enhancing the optical performance of the scintillator crystal and the detector.

In one example, a light source, either active (e.g., diodes) or passive (e.g., a phosphor or co-dopant) is disposed adjacent, or otherwise in optical communication with, a scintillator material. The light source is adapted to emit light of certain selected wavelength of wave lengths into the scintillator material. The wavelength or wavelengths of light emitted into the scintillator material are selected to depopulate the charge traps, thereby improve the optical performance of the scintillator material.

In another example, a radiation detector includes a scintillator and a light source adapted to emit light of a predetermined wavelength into the scintillator having charge carrier traps, the predetermined wavelength being suitable to depopulate the traps.

DESCRIPTION

Figure 1:
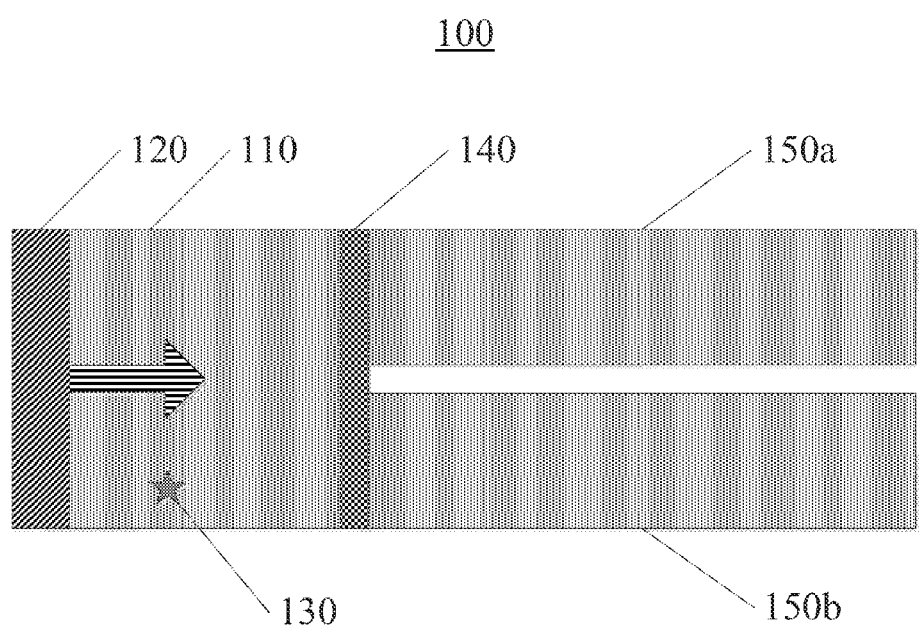
FIG. 1 schematically depicts a scintillation detector according to an aspect of the disclosure.

Many scintillation and optical properties of scintillator materials are strongly affected by a variety of defects created in the crystallographic structure during material synthesis and/or as a result of exposure to high flux of ionizing radiation. These defects, commonly known as "charge traps" or "charge carrier traps," may significantly alter kinetics of scintillation mechanism, changing the rise time and decay time of a scintillation pulse. Charge traps may capture large amount of electrons and holes generated by ionizing radiation in the volume of scintillator. These charge carriers are temporary excluded from the scintillator process or completely lost due to the non-radiative processes that take place in the material.

This effect was demonstrated by A. J. Wojtowicz et al. ([1] A. J. Wojtowicz, J. Glodo, W. Drozdowski, K. R. Przegietka, "Electron traps and scintillation mechanism in YAlO$_3$:Ce and LuAlO$_3$:Ce scintillators," Journal of Luminescence, Volume: 79, (1998) p. 275; [2] J. Glodo, A. J. Wojtowicz, "Charge traps and emission kinetics in LuAP:Ce," Proc. SPIE 4412, (2001), 216-220) in the case of well-known scintillators LuAP (LuAlO3) and YAP (YAlO3). The authors of those papers discuss the effect of charge carrier trapping phenomena on the scintillation time profile measured at different temperatures. The theory is based on a model assuming the presence of two distinct mechanisms of energy transfer between a crystal matrix (crystal lattice) and luminescence centers. The first mechanism is called a "direct" mechanism. It is independent of the second, which is called a "trap-mediated" mechanism.

The direct mechanism assumes that the charge carriers (electrons and holes) generated in the crystal as a result of absorption of ionizing radiation are transferred to the luminescence center without interaction with traps. The second, "trap-mediated" mechanism assumes that charge carriers are trapped and then released by defects prior to reaching luminescence centers. This latter process may cause some delay in the energy transfer to the luminescence center.

The direct process results in the emission of the luminescence centers with a decay time constant equal to the radiative lifetime of those centers in the crystal. The "trap-mediated" results in creation of delayed components in the scintillation pulse. The values of these delays depend on the trap life time ($\tau_{trap}$), energy depth of selected trap (E), a frequency factor (s), and temperature (T) as described by the formula below:

$$\tau_{trap} = s^{-1} \exp\left(\frac{E}{\kappa T}\right) \quad (1)$$

where $\kappa$ is the Boltzmann constant.

Contributions of these two mechanisms to the scintillation time profile are described by the following equation:

$$I(t) = I_0 \left[ \frac{a}{\tau_{rad} - \tau_0} \left\{ \exp\left(-\frac{t}{\tau_{rad}}\right) - \exp\left(-\frac{t}{\tau_0}\right) \right\} + \frac{b}{\tau_{rad} - \tau_{trap}} \left\{ \exp\left(-\frac{t}{\tau_{rad}}\right) - \exp\left(-\frac{t}{\tau_{trap}}\right) \right\} \right] \quad (2)$$

where I(t) is the intensity of the light at the time t, $I_0$ is total measured light in the single pulse, a and b are branching coefficients that describe the normalized fractions of the total scintillation light emitted in one pulse due to direct- and trap-mediated mechanisms respectively, $\tau_0$ denotes the rise time, and $\tau_{rad}$ denotes radiative decay time of luminescence center, where $\tau_0 \ll \tau_{rad}$ (see reference [1] above for details).

The first term in Equation (2) corresponds to direct component, and the second term to delayed one. It is noted that in the second term in the equation above, the rise time equals to the shorter of the two time constants $\tau_{rad}$ and $\tau_{trap}$ while the decay time equals to the longer one.

Examining the equations above, one readily sees that for certain temperatures T and selected trap parameters E and s, the $\tau_{trap}$ can be shorter than $\tau_{rad}$, and then a trap-mediated component in the scintillation profile will contribute to the rise time of the pulse. On the other hand if $\tau_{trap}$ is longer than $\tau_{rad}$ it will contribute to the decay time of the scintillation pulse. In either case, the rise and decay time will have an effect on timing resolution of the radiation detectors utilizing scintillator containing traps. Therefore, it would be very desirable to reduce the contribution trap-mediated components in scintillation process to improve the performance of the radiation detector.

One way of improving the performance of the scintillators would be to synthesize a defect-free material. However, this goal is very difficult to achieve. Another method would be to release captured charge carriers from defects using thermal depopulation of traps. However, an increase of temperature is not always practically achievable in radiation detector designs due to the numerous problems, including thermal quenching of light, degradation of components of the detector, as well as instability of its main detector characteristics.

One aspect of the present disclosure is a method for improving an optical performance parameter, such as timing resolution, of radiation detectors by reduction of trap-mediated scintillation components using optical bleaching technique (or optical trap depopulation).

Optical bleaching allows the release of captured charge carriers in the material by irradiation of this material with light. By carefully selecting light wavelengths, the population of captured carriers on certain trap levels (terms a and b in the equation) can be decreased so as to reduce the intensity of the trap-mediated components in the scintillation pulse. Optical bleaching energy required to initiate the process is very often higher than equivalent thermal energy for the same 'probability of escape' of trapped carriers. (see, e.g., [3] S. W. S. Mckeever, "Thermoluminescence of Solids," Cambridge University Press (1995), p. 137.)

For example, W. Drozdowski et al. ([4] W. Drozdowski, P. Dorenbos, R. Drozdowska, A. J. J. Bos, N. R. J. Poolton, M. Tonelli, M. Alshourbagy, "Effect of Electron Traps on Scintillation of Praseodymium Activated $Lu_3A_5O_{12}$," IEEE Trans. Nucl. Sci. Volume: 56, No. 1, (2009) p. 320-327) demonstrated the effect of optical bleaching on the intensity of X-ray luminescence measured at wide range of temperatures (10-300K). The authors used infrared laser for optical bleaching. Under exposure to light, the intensity of X-ray luminescence as a function of temperature was very stable and was not affected by traps. However, when light source was set off the X-ray luminescence intensity was dropping due to the charge carrier trapping effects.

According to another aspect of the disclosure, a radiation detector includes a scintillator material (such as a single-crystal oxyorthosilicate or halide scintillator), and a built-in light source. The light source, which can be either active (powered) or passive (unpowered) irradiates the scintillator material during normal operating mode of the detector.

Referring to FIG. 1, in one aspect of the disclosure, a radiation detector (100) includes a scintillator (110) made of a scintillator material and a light source (120) adapted and disposed to emit light of certain selected wavelengths into the scintillator. The scintillator (110) is adapted to receive radiation, which enters the scintillator (as depicted by the arrow) and interacts (130) with the scintillation material. The detector (100) further includes one or more light detectors (150a, 150b), such as photomultiplier tubes (PMTs), photodiodes, or silicon photomultipliers, which are disposed to receive the light generated by the scintillator (110), optionally through an optical filter (140, described below).

Figure 2:
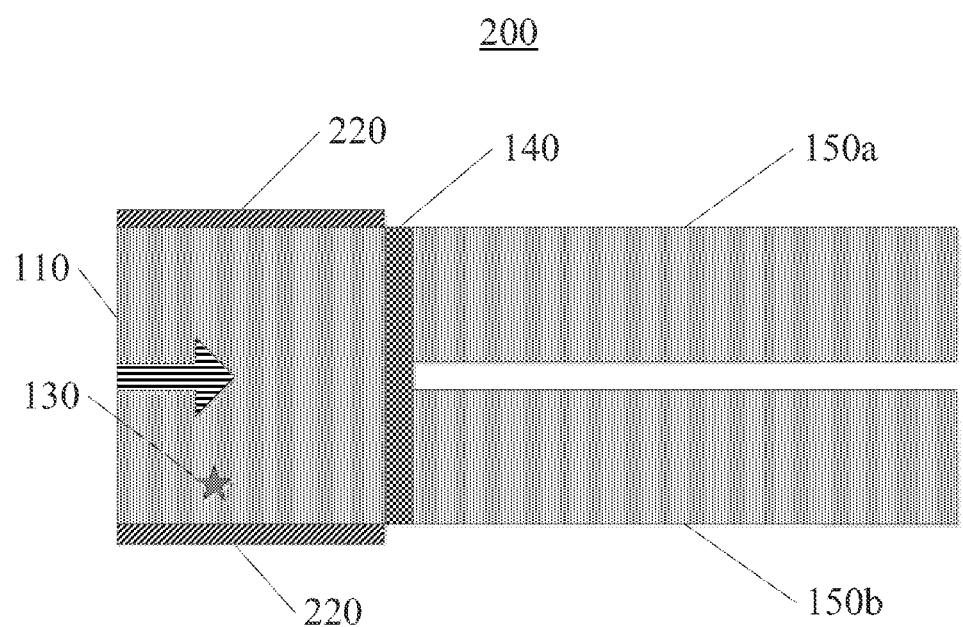
FIG. 2 schematically depicts a scintillation detector according to another aspect of the disclosure.

In the example device shown in FIG. 1, the light source (120), which may be a dispersed light source, is disposed on the radiation-receiving surface of the scintillator. Alternatively, as in the detector (200) illustrated in the example shown in FIG. 2, the light source (220) can also be disposed on the outside perimeter of the scintillator (110). In a further example, the light source can be dispersed throughout the scintillator, as in the case (described further below) of a scintillator co-doped for the purpose of optical bleaching.

In one aspect of this disclosure, one or more semiconductor diodes or laser diodes, with specifically chosen wavelengths of emission, can be used for targeting selected traps. These wavelengths of emission are chosen to meet requirements for the minimum energy needed for optical bleaching process to occur. Optical elements can be built as arrays of different diodes emitting light of wavelengths targeting different traps. The activation energy for these traps is dependent on the energy depths of the trap levels and their frequency factors.

In another aspect of this disclosure, passive optical bleaching light sources, which do not require electrical power to operate, can be used. For example tritium radiation sources with selected phosphor materials can be used to generate the desired wavelength of light. Tritium radiation sources can be encapsulated in phosphor materials to generate the desired wavelength(s) of light. The ionizing radiation emitted by Tritium source is converted to desirable wavelength by the phosphor material.

Using multiple wavelengths of light (multiple light sources), traps of multiple energy depths can be selectively targeted. This approach will allow one to eliminate selected trap components that are directly responsible for the changes in the scintillation decay time and rise time, or to reduce the effect of traps that influence scintillation light output.

In another example, phosphor materials surrounding the scintillator crystal media can be used. In this passive configuration the light generated by scintillator can be partially converted to light of the wavelength necessary to release captured charge carriers by the phosphor. If layer of phosphor has sufficient stopping power to convert directly ionizing radiation the light needed for optical bleaching can be generated by a detected radiation signal without absorption of scintillator light.

In another aspect of the present disclosure, a passive optical bleaching is achieved by specifically selected co-doping schemes during synthesis of scintillator material. The additionally added co-dopants generates the desired optical bleaching light during the scintillation process itself. In this case some small portion of the energy absorbed in the scintillation process is used to generate light of the desired wavelength(s) to optically depopulate traps. As an example, some Rare Earth ions such as Er or Yb can be used as a co-dopants depends on the selected scintillator matrix.

The light used for optical bleaching scintillators may interfere with scintillation light detected by PMTs or optical sensors. In this case, this light can be filtered out by one or more optical filters (140). In one example, an interference filter (140) with a transmission window optimized for scintillator light can be used. The filter (140) can perform the role of a light guide for detectors that require a light sharing to determine the position of the interaction.

In operation, the light source (120, 220) irradiates the scintillator material (110) during normal operation of the detector (100, 200). The optical bleaching allows charge carriers to be continuously removed from traps and used in the scintillation process without any delays.

Thus, scintillators and scintillation detectors with improved optical properties, including improved time resolution, can be made with optical bleaching. Because many embodiments of the invention can be made without departing from the spirit and scope of the invention, the invention resides in the claims hereinafter appended.

We claim:

1. A radiation detector, comprising: a scintillator comprising
    a scintillation material having charge carrier traps capable of capturing charge carriers generated in the scintillation material by radiation; and
    a light source optically coupled to the scintillator and adapted to generate and transmit into the scintillator light of a wavelength appropriate to fulfill a minimum energy requirement necessary to release captured charge carriers,
        wherein the light source comprises a passive light source, and
        wherein the passive light source comprises a co-dopant in the scintillation material, the co-dopant adapted to generate the light of the wavelength when the scintillation material receives the radiation.

2. The radiation detector of claim 1, wherein the co-dopant comprises Er or Yb.

3. The radiation detector of claim 1, further comprising a light detector optically coupled to the scintillation material and adapted to detect light generated by the scintillator material upon receiving radiation.

4. The radiation detector of claim 3, further comprising a filter disposed between the scintillation material and light detector and adapted to substantially block the light from the light source from entering the light detector.

5. The radiation detector claim 1, wherein the light source comprises a plurality of light sources each adapted to generate light of a respective wavelength, the wavelengths of light generated by the plurality of light sources being different from each other, each of the wavelengths being appropriate to fulfill a respective minimum energy requirement necessary to release charge carriers from charge carrier traps of a respective energy depth.

6. A method of radiation detection, comprising:
    detecting radiation using a scintillator to generate a light signal upon receiving radiation;
    detecting the light signal generated by the scintillator; and emitting a light of a predetermined wavelength in to the scintillator at the same time as the detecting step,
    wherein emitting a light of a predetermined wavelength comprises including in the scintillator a co-dopant adapted to emit light, by a scintillation process, of wavelength satisfying the minimum energy requirement for releasing of charge carriers captured by charge carrier traps in the scintillator.

7. The method of claim 6, wherein emitting a light of a predetermined wavelength comprises optically coupling a light source to the scintillator, wherein the wavelength satisfies the minimum energy requirement for releasing of charge carriers captured by charge carrier traps in the scintillator.

8. The method of claim 7, wherein detecting the light signal generated by the scintillator comprises optically coupling the scintillator to a light detector.

9. The method of claim 8, further comprising filtering light from the scintillator to substantially block the light from the light source from entering the light detector.

* * * * *